June 29, 1926.

H. S. OSBORNE

ARTIFICIAL LINE

Filed Oct. 21, 1919

1,590,252

INVENTOR.
H. S. Osborne
BY
ATTORNEY

Patented June 29, 1926.

1,590,252

UNITED STATES PATENT OFFICE.

HAROLD S. OSBORNE, OF NEW YORK, N. Y., ASSIGNOR TO AMERICAN TELEPHONE AND TELEGRAPH COMPANY, A CORPORATION OF NEW YORK.

ARTIFICIAL LINE.

Application filed October 21, 1919. Serial No. 332,343.

This invention relates to artificial lines for simulating the impedance of transmission circuits in which the attenuation varies with the frequency of the transmitted currents. The object of the invention is to produce a comparatively simple artificial line which will balance the real line over a wide range of frequencies. The approximation to the impedance of the line obtainable by the arrangement herein shown makes it particularly useful in non-loaded cables, such as ocean cables, but the application of the invention is not limited to such circuits. In the accompanying drawing Figure 1 diagrammatically illustrates one form of the invention and Fig. 2 shows a modification of a simpler form but giving a rougher approximation of the line impedance.

It has long been known that the impedance of a transmission line can be simulated very closely for as wide a range of frequencies as desired by an artificial line of many sections so designed that the constants of each section correspond to the linear constants of a corresponding section of actual line and in which the total, resistance, capacity, inductance and leakage are equal to the total resistance, capacity, inductance and leakage of the actual line. The higher frequencies in an ocean cable, for instance, may be simulated by a relatively small number of sections of this kind, but where low frequencies, also, are to be considered, as in telegraph signaling, this does not suffice. Where the line is to be balanced for a broad range of frequencies the number of sections required is large as in the artificial lines commonly employed in duplex submarine telegraphy. This leads to correspondingly great expense.

According to the present invention, the artificial line is composed of a limited number of sections simulating a part of the actual line, these sections being so terminated that the artificial line as a whole simulates the impedance of the actual line over a very wide range of frequencies. This is done by using as the termination for the sectional part of the line a network which itself simulates the impedance of the line over a considerable range.

Figure 1:
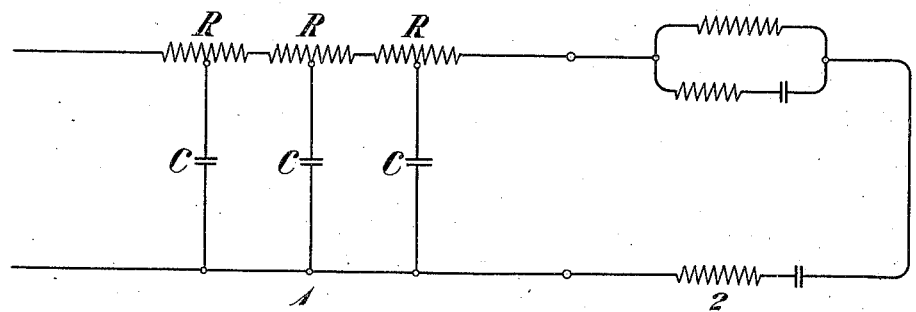
Figure 2:
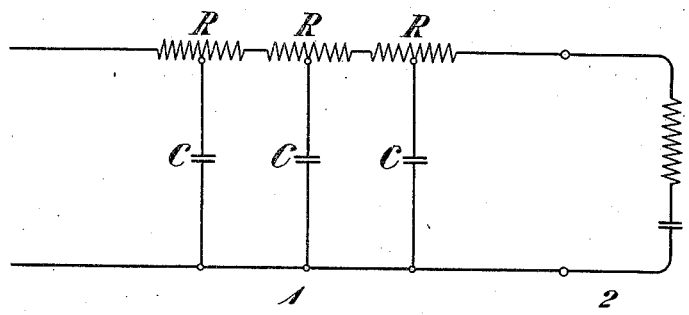

Referring to Fig. 1 of the drawing, the artificial line is shown as composed of two parts, 1 and 2. Part 1 comprises a few sections of artificial line, each consisting of series resistance R and shunt capacity C, and part 2 consisting of a network of the form shown in the patent to Hoyt, 1,240,213, September 18, 1917. This network comprises two sections connected in series, one of which consists of a non-inductive resistance and a capacity in series, and the other of a non-inductive resistance connected in parallel with a series arrangement of a non-inductive resistance and capacity. As pointed out in the Hoyt patent a simple network corresponding to part 2 may be designed to balance the line over the range of frequencies, the lowest of which bears to the highest the ratio of 1 to 10. It can, for example, be adjusted to simulate the line impedance for frequencies between 2 and 20, thus balancing for the lower frequencies met in telegraph transmission.

If then a network such as shown at 2 is placed at the end of a number of sections of artificial line such as indicated at 1 which transmit low frequencies efficiently and high frequencies progressively less efficiently, there will be an increasing discrepancy between the impedance of the simple net-work 2 and that of the actual line with higher frequencies beginning, let us say for example, at 20 cycles. The effect of this increasing discrepancy is made very slight, however, because of the continually increasing loss of energy in the transmission of current through part 1 of the artificial line to part 2 thereof. At very high frequencies the impedance of part 2 will deviate greatly from that of the actual line but the energy supplied to the artificial line will practically all be absorbed by part 1 and the deviation in the terminal impedance 2 will, therefore, not materially affect the impedance measured at the terminals of the complete artificial line.

We have thus an artificial line composed of two parts, one of which, part 2 as above described, has an impedance such that in itself, it substantially balances the real line for lower frequencies and the other, part 1 as above described, which produces a greater and greater attenuation of the currents reaching part 2 as the frequency increases; so that the lack of balance between part 2 and the real line for the higher frequencies is compensated by the increasing effect of part 1, as the frequency goes up.

Fig. 2 shows an arrangement differing from Fig. 1 only in that part 2 of the line consists of a simpler network, consisting of a resistance and capacity in series and corresponding to that shown in the patent to Hoyt, 1,167,694, January 11, 1916. This simpler form of network gives a close approximation for the impedance of open wire lines. For other circuits the approximation to the line impedance is less perfect. Where the perfection of balance obtainable by the arrangement of Fig. 1 is not essential, however, the simpler form shown in Fig. 2 may be employed for balancing non-loaded cables.

This same arrangement may be used in artificial lines designed to simulate lines in which the attenuation loss is greater with lower frequencies. In this case, however, the impedance of the terminal part 2 must be designed to balance the actual line for all frequencies under consideration above a certain limit instead of all frequencies below a certain limit, as in the case illustrated here.

It will be obvious that modifications in the details of the arrangement here shown may be made without departing from the spirit of the invention.

What I claim is:

1. An artificial line for simulating the impedance of a transmission line, comprising two parts, one of which balances the line for currents of certain of the frequencies encountered in the transmission of signals and the other of which gives an increasing attenuation of the currents as the frequency departs more and more from those balanced by the first-named part.

2. An artificial line for simulating the impedance of a transmission line for all frequencies involved in the signals to be transmitted, comprising two parts, one of which has an impedance approaching more and more the impedance of the line as the frequency decreases and the other of which attenuates more and more the currents transmitted to the first-named part, as the frequency increases.

3. An artificial line for simulating the impedance of a transmission line or electrical network comprising two parts, one of which has the impedance necessary to balance the said line to the requisite degree for the set of frequencies which are transmitted efficiently by the other and deviates from that impedance at frequencies less efficiently transmitted by the said other part.

4. An artificial line for simulating the impedance of a transmission line, comprising two parts, one of which consists of one or more sections of a reiterative network representing the actual physical constants of the line and balancing the said line at certain frequencies, and the other of which simulates line impedance for currents of frequencies which are the more efficiently transmitted by the first-named part.

5. An artificial balancing line comprising a network the impedance of which is a first approximation of the impedance of the entire line or section of line to be balanced and a second network for more closely approximating said line impedance for certain frequencies.

6. An artificial balancing line comprising a network the impedance of which closely simulates that of an actual line throughout the major portion of the frequency range to be transmitted, and a second network for making the impedance of the artificial line closely simulate that of the actual line throughout the whole of said frequency range.

7. In a line balancing network, impedance elements for balancing the entire line for certain frequencies involved in the signals to be transmitted, and other impedance elements for balancing the line at frequencies near one end of the frequency range of the signals to be transmitted.

In testimony whereof, I have signed my name to this specification this 20th day of October 1919.

HAROLD S. OSBORNE.